(12) United States Patent
Jaquet

(10) Patent No.: US 7,764,959 B2
(45) Date of Patent: Jul. 27, 2010

(54) ANALYSIS OF ARBITRARY WIRELESS NETWORK DATA USING MATCHED FILTERS

(75) Inventor: James R. Jaquet, Campbell, CA (US)

(73) Assignee: Carrier IQ, Inc., Mountain View, CA (US)

( * ) Notice: Subject to any disclaimer, the term of this patent is extended or adjusted under 35 U.S.C. 154(b) by 602 days.

(21) Appl. No.: 11/403,265

(22) Filed: Apr. 13, 2006

(65) Prior Publication Data

US 2007/0243864 A1    Oct. 18, 2007

(51) Int. Cl.
*H04W 24/00* (2009.01)

(52) U.S. Cl. ...................................... 455/423; 455/425

(58) Field of Classification Search ................ 455/423, 455/425; 379/1.01
See application file for complete search history.

(56) References Cited

U.S. PATENT DOCUMENTS

| | | | | |
|---|---|---|---|---|
| 5,442,679 A | * | 8/1995 | Regis et al. | 379/32.02 |
| 5,995,830 A | * | 11/1999 | Amin et al. | 455/423 |
| 6,038,307 A | * | 3/2000 | Fahrer et al. | 379/209.01 |
| 6,853,839 B2 | * | 2/2005 | Usuda et al. | 455/276.1 |
| 6,879,812 B2 | | 4/2005 | Agrawal et al. | |
| 7,218,928 B2 | * | 5/2007 | Park et al. | 455/423 |
| 7,359,966 B2 | * | 4/2008 | Saxena et al. | 709/224 |
| 2003/0046382 A1 | | 3/2003 | Nick | |
| 2003/0191837 A1 | | 10/2003 | Chen | |
| 2004/0093413 A1 | | 5/2004 | Bean et al. | |
| 2005/0085973 A1 | | 4/2005 | Furem et al. | |
| 2007/0010207 A1 | * | 1/2007 | Dooley | 455/67.11 |
| 2007/0049243 A1 | * | 3/2007 | Voss | 455/405 |

\* cited by examiner

*Primary Examiner*—Marivelisse Santiago-Cordero
(74) *Attorney, Agent, or Firm*—Workman Nydegger

(57) ABSTRACT

Analyzing an arbitrary data set to determine the presence or absence of a defined signature element, in order to understand an event or detect a root cause of an event in a wireless network. Signatures are generated and include signature elements. The signature elements in a given signature are associated with a coverage model. A data set is processed and values that correspond to each signature element are computed from the data set. The probability of detection for a given signature can then be computed based on the values computed from the data set, the coverage model and a statistical factor included in the signature. Different events typically have different signature elements in the associated signature.

23 Claims, 5 Drawing Sheets

ANALYSIS OF ARBITRARY WIRELESS NETWORK DATA USING MATCHED FILTERS

CROSS-REFERENCE TO RELATED APPLICATIONS

Not applicable.

BACKGROUND OF THE INVENTION

1. The Field of the Invention

Embodiments of the invention relate to wireless communications networks. More particularly, embodiments of the invention relate to analyzing arbitrary wireless network data using matched filters.

2. The Relevant Technology

As a result of advances in technology and enormous increases in the number of wireless device users, the size and complexity of wireless communications networks has greatly increased. A consequence of such increases in size and complexity has been a proportional increase in operational and performance problems associated with communications networks. Reliability issues, such as dropped calls, lack of coverage, and poor audio quality are examples of some of the operational and performance problems associated with communications networks. As new services are introduced that use even more complex technology, exercise different usage modalities, and place additional demands on networks already laden with problems, network performance will continue to be a factor that impacts usage of the technology. Quality of service has a direct impact on customer churn, a tough and costly problem that reduces profitability. Therefore, improving quality of service is a top priority for service providers.

Maintaining an acceptable level of service quality in continually changing networks is a difficult task. Wireless networks, for example, are constructed in changing environments. Seasonal changes, land development, network additions, and the addition of new services are examples of a changing environment. These changes and others often require continual monitoring and tuning in order to maintain an acceptable level of service quality.

The difficulties in maintaining service quality is evident by the fact that many users of cellular networks often experience, for example, dropped calls, insufficient signal, or other problems. Often, the number of reported incidents or problems for a given wireless network can overwhelm the capacity of the associated carrier to investigate and resolve the reported problems. As a result, carriers often resort to counts of problem incidents in geographic areas as a means to select which problems are the most important and then work to resolve those selected problems.

Because carriers are often making an educated guess regarding the problems that are being experienced in a wireless network, it may be the case that relatively unimportant problems, in terms of business value, are being addressed at the cost of larger problems.

Carriers have access to huge quantities of data, but do not have adequate tools that enable them to effectively triage, diagnose and eliminate the various problems that may arise in a wireless network. This lack of tools, when combined with the lack of resources to address all of the problems in a wireless network, leads to an inefficiently monitored network, to unresolved network problems, and to poor quality of service. Systems and methods are needed that can identify with more assurance the cause of the problems that are occurring in a wireless network. The ability to better classify problems in a wireless network can lead to gains in efficiency and better allocation of the resources used to address those problems. These operational improvements will precipitate better customer retention and easier customer acquisition—two underpinnings of gains in market share and increased profitability.

BRIEF SUMMARY OF THE INVENTION

These and other limitations are overcome by embodiments of the present invention, which relates to systems and methods for analyzing a data set to detect the presence or absence of a defined signature in the data set. A defined signature typically includes various signature elements that collectively identify a particular event or situation. Each event or situation that may occur or be present in a wireless network, for example, can be identified using a defined signature. The data set is compared to the modeled signature by comparing the signature elements to data collected from the device or from the network. How well the actual data matches with the defined signature can be interpreted to determine the probability that a particular event occurred.

Wireless devices operating in a wireless network can collect information that is related to usage of the device in the network. The received strength signal indicator (RSSI), signal to noise ratio, tower or sector lists, transmitted and/or received power, and the like are examples of data that can be collected. The data is collectively referred to as a data set and can be obtained from a device or from another source such as a server or a network log.

In order to identify the root cause of an event in a network, for example, signatures are created or defined for various types of events or situations. Each signature includes signature elements and the data set is evaluated to generate values that correspond to the signature elements. The result of the signature evaluation (or matched filter processing) is a combination of the values that are generated for the individual signature elements (or a subset of the signature elements). In one example, the result of a particular signature evaluation is a probability of detection associated with a particular event or situation. The probability of detection indicates the probability that a particular event was detected. The contribution of the values for each signature element or a subset of the signature elements computed from the data set to the probability of detection can depend on how each signature is weighted as well as a coverage model included in the signature. Once the analysis is completed, the probability of detection reflects the likelihood that a particular event was detected.

In one example, a method for analyzing network data using matched filters first obtains a data set from a source such as a device or a log. Values that correspond to signature elements are computed from the data set. Next, the computed values are evaluated based on the signature elements of a matched filter and a probability of detection is computed based on the signature elements and their associated values. In other words, a particular signature may only include certain signature elements and only the values computed for these signature elements are included in the analysis.

In another example, a method analyzing a data set to determine a root cause of an event in a wireless network begins by identifying signature elements to be included in a signature for a particular event. Then, a coverage model is established for each of the signature elements. The coverage model identifies ranges for each signature element. Next, a value for each signature element is computed from a data set obtained from a source such as a wireless device or log and a range in the coverage model is identified for each value. Then, a probability of detection for a particular event is determined based at least on each value and on each range associated with each value.

In another example, a method analyzing a data set to determine if the establishment of a network of activity (device communicating with the network) by a device was the result of operator action, periodic registration, or an event typically associated with movement such as a zone-based registration or Packet Control Function (PCF) handoff.

The signatures used to detect or to identify an event or situation can be applied to various scenarios. Embodiments of the invention include signatures to detect the root causes of failed and/or dropped calls, determine if a mobile device moves during the call or during use, determine if a device is inside a building, determine if an end-user is accessing secure menus on the device, and determine if metrics are being correctly submitted, and the like or any combination thereof.

These and other advantages and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

Embodiments of the invention relate to systems and methods for inspecting arbitrary data that is associated with a wireless network. The data is inspected with signatures to more accurately identify the root cause of any event or problem that the device may experience. The ability to identify the root cause of any particular problem can enable resources devoted to monitoring and/or maintaining a wireless network to be allocated more efficiently. In addition, identifying the specific cause of a problem with a device in a wireless network or with the wireless network itself ensures that the root problem is being addressed rather than other ancillary symptoms of the root problem.

There are many problems that a device may experience in a wireless network. These problems often relate, for example, to dropped calls or to blocked calls. However, the reason why a particular call was dropped or blocked can have a substantial impact on how the issue is addressed in the network.

For example, a call may be dropped, by way of example and not limitation, to a coverage hole, to an unpromoted strong pilot, or to a neighbor list problem. A coverage hole refers, in one embodiment, to an geographic area where a device is unable to communicate with the wireless network. In other words, a device in a coverage hole may not be receiving sufficient signals from any sector. An unpromoted strong pilot, in contrast, typically occurs when a sector of a tower becomes available but is transmitting with sufficient power such that attempts by the device to switch to that sector fail and the frame error rate of the device climbs to the point that the call is dropped. A neighbor list problem occurs when a device is unaware of a particular sector or sector. The solutions to these problems are all different. As a result, the inability to identify the actual root cause of a dropped call can lead to the inefficient use of resources as previously described.

Figure 1:
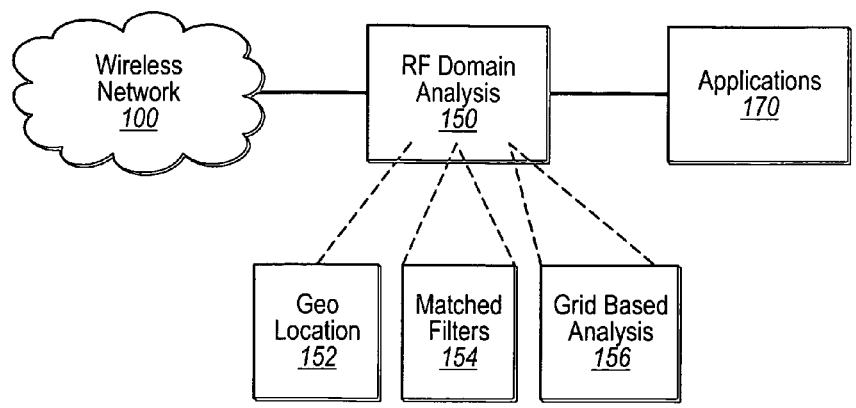
FIG. 1 illustrates an exemplary environment for implementing embodiments of the invention.

FIG. 1 illustrates an exemplary environment for implementing embodiments of the invention. FIG. 1 illustrates a wireless network 100 in which wireless devices operate. Examples of wireless devices include, but are not limited to, cellular telephones, wireless enabled computers, and other devices. A typical wireless network 100 uses multiple sectors that are placed within the network 100 in order to provide the various wireless devices with access to the network 100.

The placement of the towers in the network 100 is typically designed to ensure that a device can access the wireless network 100 from anywhere within range of the towers or within a certain geographic area. As previously indicated, however, there are environmental changes or aspects that may prevent this type of coverage from being obtained. Land development, buildings, geographical formations, seasonal changes, radio frequency interference, and the like are examples of environmental changes that can affect the function of the wireless network. The impact of these items is manifest by coverage holes in the network, dropped calls, neighbor list problems, unpromoted strong pilot issues, blocked calls, and other network problems or combinations thereof.

While a device is operating in the wireless network 100, it can typically collect data that is related to the operation of the device in the wireless network 100. The data collected by a wireless device can include, by way of example, the received strength signal indicator (RSSI) for one or more of the towers, or more specifically, the sectors (each tower typically has more than one sector) that the device is aware of and/or in communication with, a signal to noise ratio, a frame error rate of the call or other usage of the device, a clock value from one or more of the towers or sectors, number of CDMA frequency changes during a call, the transmitted power of the wireless device, information about messages received and/or acknowledged such as reverse link messages, forward link messages, and the like.

This information or data set (see FIG. 2) can be analyzed in an RF domain analysis 150. The data set may also include information provided by the network itself rather than just from the wireless device. In the RF domain analysis 150, geolocation 152 and grid based analysis 156 are performed on the data set. Geolocation relates to the ability to locate the device within the wireless network. The grid based analysis 152 relates to characterizing the performance of the wireless network and is more fully described in co-pending U.S. patent application Ser. No. 11/403,263, filed the same day as the present application and entitled SYSTEMS AND METHODS FOR CHARACTERIZING THE PERFORMANCE OF A WIRELESS NETWORK. The foregoing applications are hereby incorporated by reference in their entirety.

The matched filters 154 analysis can inspect arbitrary data feeds including but not limited to data sets collected from wireless devices, application server logs, network element logs, application streams, and the like or any combination thereof. The data feeds are then analyzed using matched filter specifications to detect various signatures in the data that correspond to certain conditions. Matched filter specifications can be developed, by way of example, to identify the root cause of call drops (unpromoted strong pilot, coverage hole, neighbor list error, etc.), to detect in-building conditions, device re-registration caused by a PCF handoff, and the like or any combination thereof.

Figure 2:
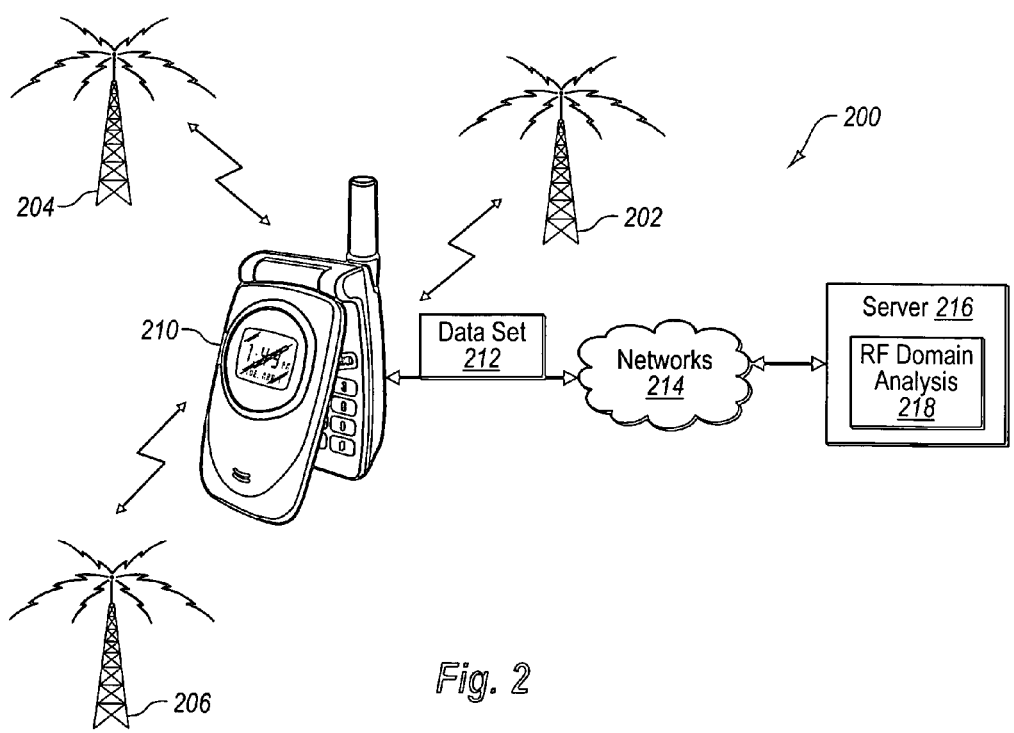
FIG. 2 illustrates an exemplary device in a network that is associated with a data set used to perform RF domain analysis.

FIG. 2 illustrates an exemplary device operating in a wireless network. In FIG. 2, the device 210 is operating in a wireless network 200. The device 210 may be aware of one or more of the sectors of the towers 202, 204, and 206. In this example, the device 210 may be locked onto a particular sector of the tower 202 but still be aware of the other towers or of particular sectors of those towers. The sectors may be divided, in one example, into active sectors, candidate sectors and neighbor sectors. Active sectors are in communication with the device, candidate sectors have a strong signal and are sectors that the device may communicate with in the future, and neighbor sectors are other sectors that the device is aware of.

During operation of the device, a data set 212 may be generated for a particular use of the device, such as a call. The data set 212 can include information about the RF attributes the device experiences as well as other data. By way of example, the data set 212 may include an RSSI for at least one of or each of the sectors of the towers 202, 204, and 206. The data set 212 may also include signal strengths, transmit power, receive power, signal to noise ratio, frame error rate, number of link messages, reverse link messages, device usage (including menu usage), device location if known, tower or neighbor lists, and the like or any combination thereof. The data set 212 may also include aspects of the device 210 such as ROM version, operating system, device settings, and the like or any combination thereof. The data set 212 is then transmitted to the server 216 over the networks 214 (which may include the wireless network 200). The server 216 can perform the RF domain analysis 218 using the data set. As previously stated, the data set can be obtained from other sources such as server logs, etc.

Figure 3:
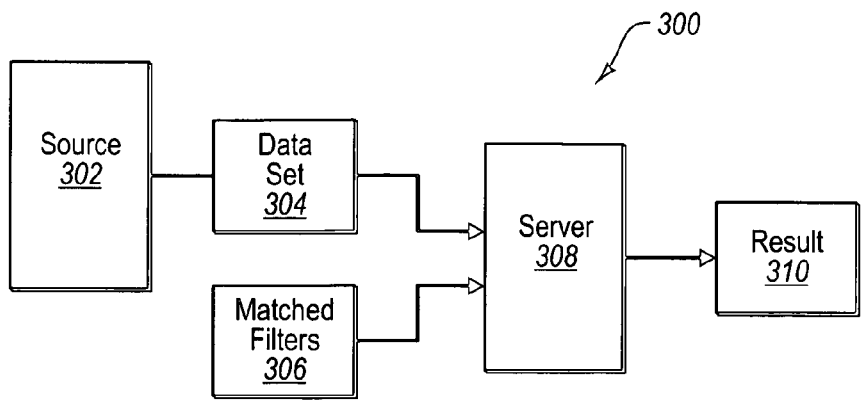
FIG. 3 is a block diagram illustrating one embodiment of a system for analyzing a data set with matched filters.

FIG. 3 illustrates a block diagram for analyzing an arbitrary data stream. A data set 304 from a source 302 and one or more matched filters 306 are used by a server 308 to produce a result 310. More particularly, the inputs to the server 308 are a data set 304 and a matched filter 306. Each matched filter (also referred to has a matched filter specification) is a signature designed to identify a particular item or problem. The result 310, in one embodiment, provides a probability that the data set 304 corresponds to a particular problem as defined by the matched filter 306. Matched filters 306 can determine, by way of example and not limitation, root causes for call failures or drops, statistics on network access attempts (number of access probes before successfully acquiring the network, data transfer rates, voice quality, percentage of time spent in soft-hand-off, impact area of PCF boundaries, user visible errors and actions that impact the wireless service, and the like.

Figure 4:
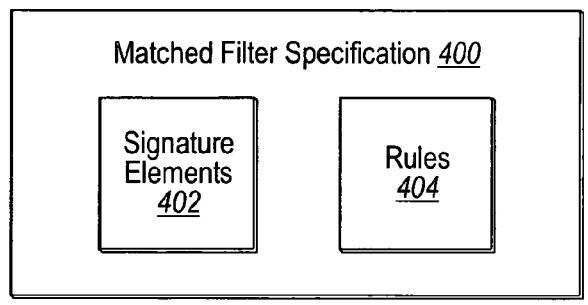
FIG. 4 illustrates one embodiment of a matched filter specification that includes both signature elements and rules.

As illustrated in FIG. 4, each matched filter specification 400 includes signature elements 402 and rules 404. The signature elements 402 are those aspects of a data set that tend to define a particular aspect of the wireless network or of a wireless device. In other words, dropped calls, call blocks, coverage holes, and the like are defined by a particular signature, which includes various signature elements. The signature elements 402 for each filter are typically different. The rules determine how the various signature elements 402 and/or the data set 304 are combined, transformed, augmented, evaluated, weighted, etc., to form the definition of the matched filter specification 400.

With reference back to FIG. 3, the data set 304 can be processed by the server 308 for the appropriate signature elements of the matched filters 306. In other words, the data set 304 is processed to provide values for the various signature elements in the matched filter 306. Thus, if a particular matched filter requires the RSSI for the primary sector, then the server 308 prepares this information from the data set 304 to obtain the RSSI value. Once the signature elements are completed and the values are generated from the data set, the result 310 can be computed. As previously indicated, the result 310 is usually in terms of a probability.

Advantageously, the signature elements and the matched filter specifications are extensible and tunable. In other words, the set of signature elements 402 of the matched filter specification 400 can change, for example, by adding or removing signature elements. The signature elements 402 or the rules 404 can also be tuned (changing value ranges, etc.) in order to maximize the result 310 and to minimize false positives.

In addition, there is no requirement that a complete data set be provided in order to generate a result. For example, some of the data needed for the matched filter specification may be incomplete or missing from the data set. Incomplete or missing data, however, does not prevent the server 308 from generating the result 310 based on the available data set 304. For example, if the matched filter specification 400 has 7 signature elements and data is only available for 5 of the signature elements, the server 308 can still generate the result 310. The lack of information in the data set 304 is reflected in the result 310.

Figure 5:
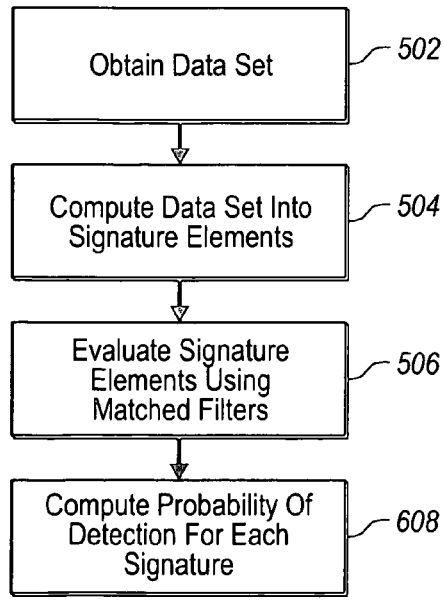
FIG. 5 is a flow chart illustrating an exemplary method for analyzing network data using matched filters.

FIG. 5 illustrates an exemplary flow diagram for analyzing a data set from a device in a wireless network or from another source. The method typically begins by obtaining a data set 502. The data set can be obtained from a device, from a server log, and the like or any combination thereof. Next, the data set is computed into signature elements 504. This may include processing the data set to identify those portions of the data set that correspond to specific signature elements. For example, if a signature includes a signature element for the frame error rate during the last 5 seconds of a call, then this value is computed from the data set. Thus, all possible values for all defined signature elements can be computed regardless of whether a particular signature element is required. Alternatively, embodiments of the invention may only process the data set for signature elements included in particular signature.

After the values of the signature elements are computed from the data set, the signature elements are evaluated using the matched filters 506. After evaluating the computed signature elements, the probability of detection (Pd) is determined for each matched filter, which is a signature for a particular event. For example, the probability that the event is a coverage hole is computed based on how the computed signature elements are evaluated by the matched filter designed to detect a coverage hole. As previously stated, the matched filter can operate on the available data and does not require a full set of data to produce a probability of detection.

The probability of detection can also be improved using empirical data or by using posterior probabilities. The probability of detection can be improved or altered by taking certain occurrence or conditions into account. The signature detection capabilities can be enhanced by considering the occurrence of a condition or the probability of the condition when evaluating a new decision.

For example, a dropped call can have multiple causes such as an unpromoted pilot or a missing neighbor. The condition or pre-condition that may be used when determining the probability of detection is forward link interference, as determined by measuring the forward frame error rate. If forward link interference is detected, this condition can impact the probability of detection for various matched filters. When forward link interference is detected and a device reacquired the network on a strong pilot that was in the candidate list rather than the active list, then the probability of an unpromoted strong pilot is higher that the probability of detection for a missing neighbor.

Figure 6:
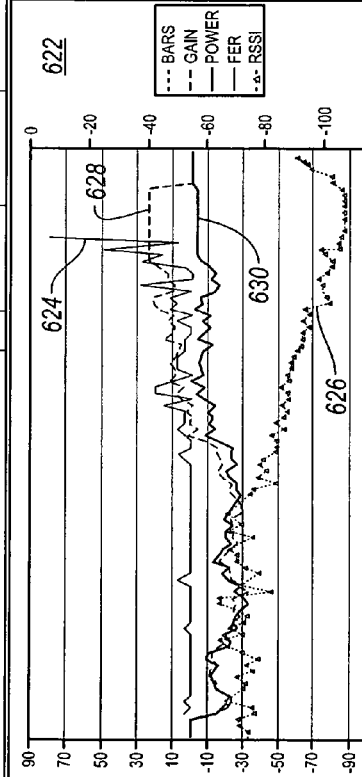
FIG. 6 illustrates one embodiment of a signature and included signature elements used to detect a coverage hole in a wireless network.

FIG. 6 illustrates an example of a matched filter for coverage hole detection and also indicates a particular data set that has been evaluated using the matched filter. The matched filter 600 includes signature elements 602. As illustrated in FIG. 6, the signature elements used to detect a coverage hole include: (1) average RSSI for the last 5 seconds of the call; (2) slope of the RSSI trend line for the last 5 seconds of the call; (3) average RSSI for the last 10 seconds of the call, and etc. (see rows 1-26). Some of the signature elements 602 take the same data in different contexts or time periods. The RSSI, for example, may be used in more than one signature element.

The column 604 illustrates the computed values of the signature elements from the source data set and the columns 607 illustrate the coverage model of the signature 600 in terms of percentages. Thus, the computed values are compared to the ranges in the coverage model. In this example, the highlighted areas indicate where the computed values fall for a specific data set. The column 606 indicates a range that effectively qualifies for a 100% match. The columns 608, 610, and 612 similarly indicates ranges of the computed values in the column 604 that qualify respectively for 75% match, 50% match, and 25% match.

The column 614 identifies the coverage weighting factor, the column 616 identifies the normalized weighting factor and the column 618 identifies the contribution of the computed value to the overall probability of detection 620. Note that the values in these columns 614 and 616 can be changed, thereby enabling the signature element to be tuned. Also, the ranges that included in the coverage model 607 can also be altered to tune the matched filter. The filter 600 can also be tuned by adding and/or removing signature elements.

For example, the computed value for (1) the average RSSI for the last 5 seconds of the call is −104.6 as shown in the column 604. This falls in the range of −100 to −110 and is therefore a 100% match. Because the computed value for this signature element is a 100% match, it receives a full contribution to the probability of detection 620. The signature element (3) of R2 of RSSI slope for last 5 seconds of call, however, has a computed value of 0.35. This falls in the range associated with a 50% match in the column 610. As a result, the contribution of this signature element to the probability of detection 620 is reduced. The contributions from the various signature elements can be summed to produce the probability of detection 620.

The graph 622 is provided to provide a visual analysis of some of the signature elements that are included in the matched filter 600. As illustrated, the frame error rate 624 increases towards the end of the call, the RSSI 626 drops near the end of the call and the gain 628 and the power 630 go to zero. Based on this particular data set illustrated by the computed values in the column 604, the probability of detection of 0.91666 corresponds to the probability that a coverage hole has been detected.

The signature 600 illustrates one example of a matched filter that can provide a probability that the reason a particular call was dropped in because of a coverage hole. The signature 600 therefore can identify a coverage hole detection.

Figure 7:
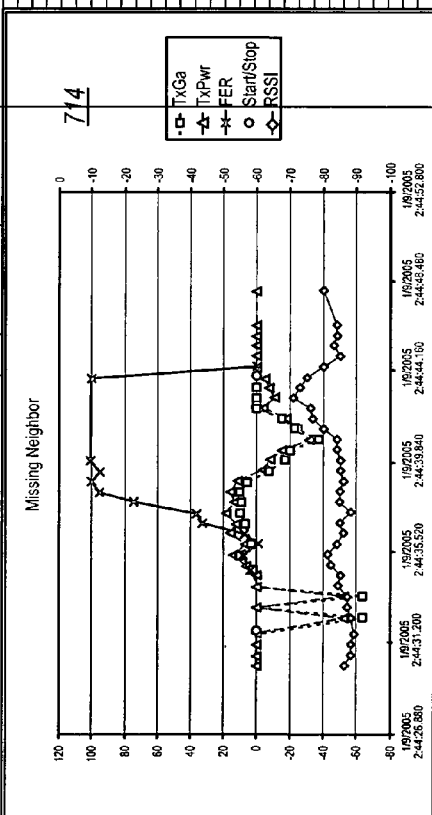
FIG. 7 illustrates one embodiment of a signature and included signature elements used to detect a missing neighbor problem.
Figure 8:
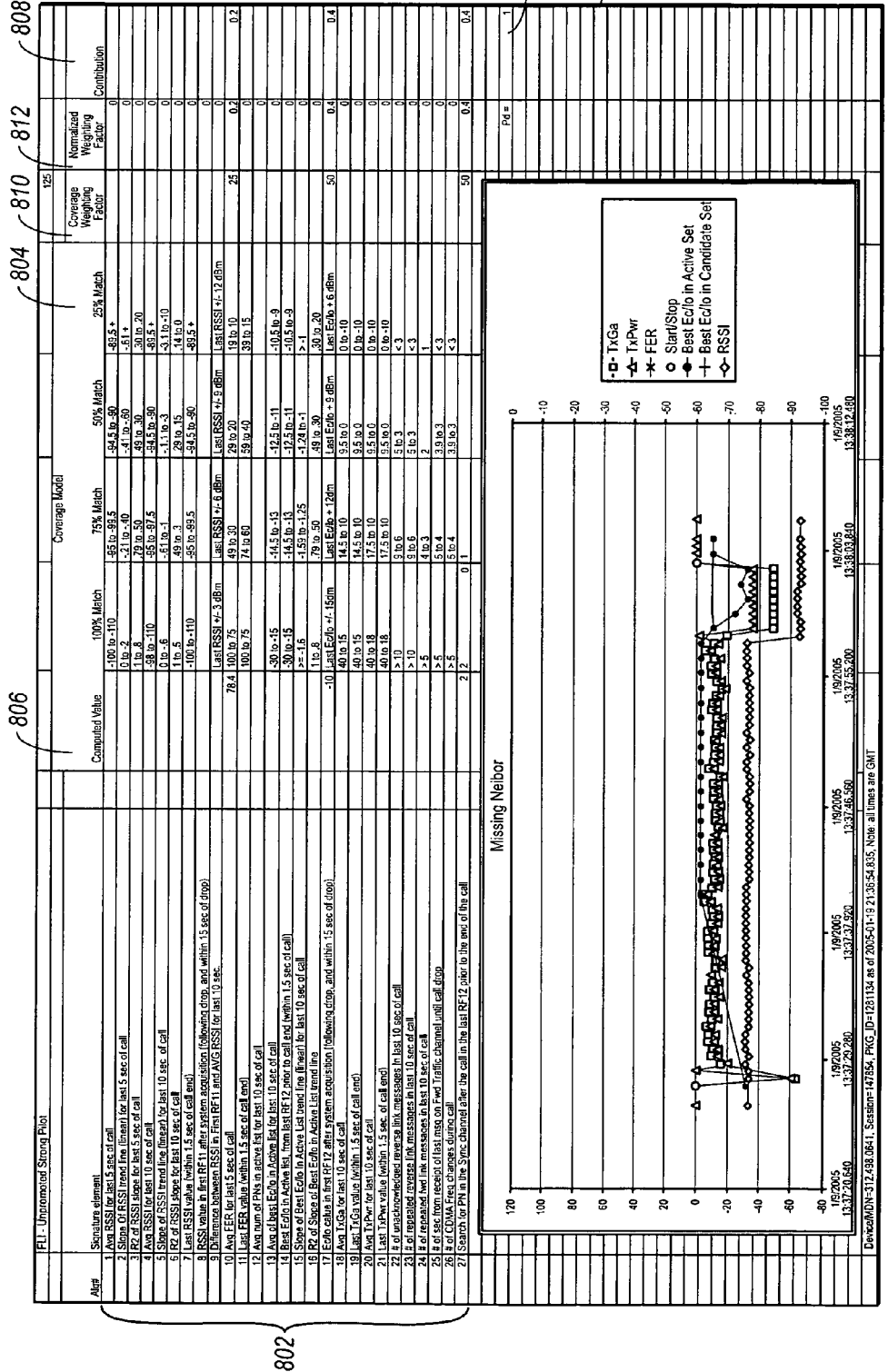
FIG. 8 illustrates one embodiment of a signature and included signature elements used to detect an unpromoted strong pilot issue.

FIGS. 7 and 8 illustrate the signatures for a neighbor list problem and an unpromoted strong pilot problem, respectively. Although FIGS. 6, 7, and 8 illustrate certain signature elements in each signature, one of skill in the art can appreciate that the signatures are illustrative in nature and can be tuned. In fact, the signature elements included in any particular signature may differ from network to network. Alternatively, the protocol or type of wireless network may have an impact on the signature elements included in any particular signature.

The signature 700 illustrated in FIG. 7, includes the signature elements 702 that are used to provide a probability of detection 712 that a missing neighbor or a neighbor list problem is the reason for a dropped call. In this example, the signature elements 704, 706, and 708 are weighted such that only these three signature elements are required. The graph 714 illustrates a plot of various values of the data set over the usage of the device.

FIG. 8 illustrates the signature elements 802 that are used to provide a probability of detection that an unpromoted strong pilot is the reason for a dropped call. Values in the column 806 can be computed for the signature elements 802 using a data set. The computed values in the column 806 are then mapped or fit to the ranges in the coverage model 804. The contribution 808 of each signature element is determined based on the coverage weighting factor 810 and the normalized weighting factor 812. The probability of detection 814 for an unpromoted strong pilot can then be determined.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for analyzing network data using matched filters, the method comprising:

obtaining a data set from a source operating within a network, wherein the data set is associated with an event experienced by the source during operation of the source in the network;

computing, by a server, one or more values from the data set, the one or more values corresponding to one or more signature elements of a matched filter wherein the one or more signature elements of the matched filter are configured to define a root cause of the event experienced by the source and wherein each signature element is defined by a range of values;

evaluating the one or more values based on the one or more signature elements included in the matched filter to generate a contribution for each of the signature elements to a probability of detection based on how the one or more values compare with the range of values; and computing, by the server, the probability of detection for the matched filter based on the contributions from the one or more signature elements, the probability of detection indicating a likelihood that the root cause of the event has occurred at the source of the data set.

2. A method as defined in claim 1, wherein computing a probability of detection further comprises computing the probability of detection based on posterior probabilities.

3. A method as defined in claim 2, wherein computing the probability of detection based on posterior probabilities further comprises identifying one or more conditions for the matched filter.

4. A method as defined in claim 1, wherein obtaining a data set from a source further comprises obtaining a data set from one or more of a wireless device, a server log, network log, or application stream.

5. A method as defined in claim 1, wherein computing one or more values from the data set further comprises identifying the one or more signature elements included in the particular matched filter.

6. A method as defined in claim 1, wherein evaluating the one or more values based on the one or more signature elements further comprises providing a coverage weighting factor for each signature element.

7. A method as defined in claim 1, wherein evaluating the one or more values based on the one or more signature elements further comprises providing a normalized weighting factor for each signature element.

8. A method as defined in claim 1, wherein evaluating the one or more values based on the one or more signature elements further comprises identifying the contribution to the probability of detection for each value computed from the data set by comparing each value to the corresponding range of values.

9. A method as defined in claim 1, wherein evaluating the one or more values based on the one or more signature elements further comprises identifying a match in a coverage model for each value.

10. A method as defined in claim 1, wherein evaluating the one or more values based on the one or more signature elements further comprises providing a graph plotting one or more of the signature elements over a usage of the wireless device.

11. A method for analyzing a data set to determine a root cause of an event in a wireless network, the method comprising:

identifying one or more signature elements to be included in a matched filter, the matched filter associated with the root cause of the event and the signature elements selected to define the root cause of the event;

establishing a coverage model for each of the one or more signature elements, wherein the coverage model defines ranges for at least some of the one or more signature elements;

computing, by a server, a value for at least one of the signature elements using a data set obtained from a source operating in the network;

determining how the computed values fit in the ranges for the one or more signature elements; and generating, by the server, a probability of detection for the matched filter based at least on each computed value and on each range associated with each value, wherein a contribution of each computed value to the probability of detection is determined by how each computed value relates to the corresponding range, the probability of detection indicating a likelihood that the root cause of the event defined by the matched filter has occurred at the source.

12. A method as defined in claim 11, wherein identifying one or more signature elements to be included in a matched filter further comprises one or more of: adding new signature elements to the matched filter; or removing signature elements from the matched filter.

13. A method as defined in claim 11, wherein the root cause of the event is one or more of:
a neighbor list problem;
an unpromoted pilot problem;
a coverage problem;
a sector overshoot problem;
a hard hand-down problem;
an incomplete handoff;
a weak RF condition;
a device entering or exiting roaming conditions;
a device in the vicinity of a switch boundary;
a device in the vicinity of a frequency boundary;
a device in the vicinity of a coverage boundary;
a call initiated by a user;
a call initiated by the network;
a call initiated by a specific application on a device;
a call aborted by a user due to poor service;
mobile too far from base station to initiate call;
evaluation of the RF performance of a device;
statistics on network access attempts;
data transfer rates, in aggregate or by application;
voice quality;
time spent in soft-handoff;
impact area of Packet Control Function (PCF) boundaries;
movement of a device within the wireless network;
determining if a device is inside a building;
identifying usage of a device;
determining if metrics are correctly submitted; or
user visible errors.

14. A method as defined in claim 13, wherein generating a probability of detection for the matched filter based at least on each computed value and on each range associated with each value further comprises generating a probability of detection based on one or more conditions that occur prior to the event, wherein the posterior probability of the one or more conditions is included in the probability of detection.

15. A method as defined in claim 11, wherein establishing a coverage model for each of the one or more signature elements further comprises establishing one or more ranges in the coverage model for each of the one or more signature elements.

16. A method as defined in claim 15, further comprising tuning the matched filter for the root cause of the event.

17. A method as defined in claim 15, wherein the data set is incomplete such that values are only computed for signature elements having associated data in the data set.

18. A method as defined in claim 15, wherein identifying one or more signature elements to be included in a matched filter further comprises:

defining a coverage weighting factor for each of the one or more signature elements;

defining a normalized weighting factor for each of the one or more signature elements;

computing a contribution to the probability of detection for each of the one or more signature elements based on the value for the at least one of the signature elements.

19. A method as defined in claim 18, further comprising determining the contribution based on one or more of the range in the coverage model associated with the value computed from the data set, the coverage weighting factor, and the normalized weighting factor.

20. A method for analyzing a data set received from a source operating in a wireless network to identify a root cause of an event experienced by: the source, the method comprising:
   obtaining one or more signature elements of a matched filter, by a server, wherein the one or more signature elements define a root cause of an event;
   determining a coverage model for each of the one or more signature elements, wherein the coverage model identifies ranges for each of the one or more signature elements, wherein the data set received from the source is evaluated to determine computed values for each of the one or more signature elements;
   determining a statistical factor for each signature element, wherein the statistical factor determines a weighting factor for each of the one or more signature elements;
   determining a contribution for each signature element, the contribution of each signature element based on the statistical factor and the computed value for each signature element; and
   generating, by the server, a probability of detection that indicates whether the event occurred at the source, wherein the probability of detection is determined from the contribution of each signature element and wherein the probability of detection identifies a likelihood that the event was caused by the root cause.

21. A method as defined in claim 20, wherein the statistical factor comprises: a coverage weighting factor for each signature element; and a normalized weighting factor for each signature element.

22. A method as defined in claim 20, wherein the root cause of the event is one or more of:
   a neighbor list problem;
   an unpromoted pilot problem;
   a coverage problem;
   a sector overshoot problem;
   a hard hand-down problem;
   an incomplete handoff;
   a weak RF condition;
   a device entering or exiting roaming conditions;
   a device in the vicinity of a switch boundary;
   a device in the vicinity of a frequency boundary;
   a device in the vicinity of a coverage boundary;
   a call initiated by a user;
   a call initiated by the network;
   a call initiated by a specific application on a device;
   a call aborted by a user due to poor service;
   mobile too far from base station to initiate call;
   evaluation of the RF performance of a device;
   statistics on network access attempts;
   data transfer rates, in aggregate or by application;
   voice quality;
   time spent in soft-handoff;
   impact area of Packet Control Function (PCF) boundaries;
   movement of a device within the wireless network;
   determining if a device is inside a building;
   identifying usage of a device;
   determining if metrics are correctly submitted; or
   user visible errors.

23. A method as defined in claim 20, wherein the one or signature elements comprise one or more of:
   an average received strength signal indicator (RSSI);
   an average RSSI for a given time period;
   a slope of an RSSI average for a given time period;
   a frame error rate; a frame error rate for a given time period;
   a slope of a frame error rate for a given time period;
   an average of transmit power;
   an average of transmit power for a given period of time;
   an average of transmitter gain state;
   an average of transmitter gain state for a given period of time; a statistic on protocol message acknowledgement;
   a change in frequency used by the device; the geo-location of a device;
   a statistic based on the geo-location of a device; or
   a statistic on an identity and strength of sectors visible to a device.

* * * * *